(12) United States Patent
Spoerry et al.

(10) Patent No.: US 7,835,884 B2
(45) Date of Patent: Nov. 16, 2010

(54) DEVICE AND METHOD FOR ESTIMATING A SIDE-SLIP ANGLE OF AN AIRCRAFT

(75) Inventors: Thomas Spoerry, Ox (FR); Bruno Chauveau, Toulouse (FR)

(73) Assignees: AIRBUS, Blagnac (FR); Airbus France, Toulouse (FR)

( * ) Notice: Subject to any disclaimer, the term of this patent is extended or adjusted under 35 U.S.C. 154(b) by 101 days.

(21) Appl. No.: 12/234,946

(22) Filed: Sep. 22, 2008

(65) Prior Publication Data
US 2009/0099811 A1   Apr. 16, 2009

(30) Foreign Application Priority Data
Oct. 11, 2007   (FR)   ................................ 07 58233

(51) Int. Cl.
*G06F 15/00* (2006.01)
*G01C 21/00* (2006.01)
(52) U.S. Cl. ........................ 702/151; 73/180
(58) Field of Classification Search ............ 702/94, 702/95, 151; 701/3, 5; 73/180, 182; 244/184
See application file for complete search history.

(56) References Cited

U.S. PATENT DOCUMENTS

| | | | | |
|---|---|---|---|---|
| 5,590,853 | A | * | 1/1997 | Greene .................... 244/184 |
| 5,616,861 | A | * | 4/1997 | Hagen .................... 73/180 |
| 6,176,130 | B1 | | 1/2001 | Nakaya et al. |
| 2008/0168835 | A1 | * | 7/2008 | Lassouaoui et al. ...... 73/170.11 |

FOREIGN PATENT DOCUMENTS

| | | |
|---|---|---|
| EP | 0 296 951 | 12/1988 |
| FR | 2 817 044 | 5/2002 |

OTHER PUBLICATIONS

U.S. Appl. No. 12/599,898, filed Nov. 12, 2009, Spoerry, et al.

* cited by examiner

*Primary Examiner*—Bryan Bui
(74) *Attorney, Agent, or Firm*—Oblon, Spivak, McClelland, Maier & Neustadt, L.L.P.

(57) ABSTRACT

A device and method for estimating a side-slip angle ($\beta_e$) of an aircraft moving in the air includes a receiving unit which receives a measured side-slip angle ($\beta_l$) presented locally by the air relative to the aircraft, and a determining unit which determines the side-slip angle ($\beta_e$) of the aircraft as a function of the measured angle ($\beta_l$) and of an information item about the incidence ($\alpha$) of the aircraft.

16 Claims, 1 Drawing Sheet

DEVICE AND METHOD FOR ESTIMATING A SIDE-SLIP ANGLE OF AN AIRCRAFT

BACKGROUND OF THE INVENTION

The invention relates to a device, to a system and to a method for estimating a side-slip angle of an aircraft.

A traditional method for estimating the side-slip angle of an aircraft moving in the air is to use dedicated transducers that locally measure the orientation, in a horizontal plane, of air streams relative to the aircraft, immediately providing access to the side-slip from the relative movement of the aircraft in the air at the measurement location.

When it is determined locally in this way, the side-slip information item delivered by the transducer is usually transmitted to the different systems of the aircraft (whether they are display or navigation systems using this information item) as an information item representative of the side-slip angle of the entire aircraft in the air flow.

Nevertheless, a difference exists between the locally measured side-slip angle and the general side-slip angle of the aircraft, especially because of the particular situation of the transducer in question. For example, the side-slip angle $\beta_A$ of the airplane may be effectively defined as the angle between the axis X of the fuselage and the flight direction $\vec{V}_A$ in the air mass projected onto a horizontal plane associated with the airplane.

SUMMARY OF THE INVENTION

In order in particular to remedy this disadvantage and consequently to improve the estimate of the side-slip angle of the aircraft, the invention proposes a device for estimating a side-slip angle of an aircraft moving in the air, characterized by means for receiving a measured side-slip angle presented locally by the air relative to the aircraft and by means for determining the side-slip angle of the aircraft as a function of the measured angle and of an information item about the incidence of the aircraft.

In this way it is possible to correct the measurement error associated with the positioning of the transducer, which error has been noticed by the inventors to depend in particular on the angle of incidence of the aircraft.

According to a first possible embodiment, the means for determining the side-slip angle of the aircraft may comprise means for multiplying the measured side-slip angle by a first factor that depends on the incidence information item and/or means for adding a second factor that depends on the incidence information item.

According to another possible embodiment, the means for determining the side-slip angle of the aircraft comprise means for reading the side-slip angle of the aircraft in a correspondence table having at least the measured angle and the incidence information item as entries.

In this case it is also possible to provide means for selecting the said correspondence table as a function of an information item indicative of the configuration of the lift devices of the aircraft, thus making it possible to adapt the correction to the aerodynamic configuration of the aircraft.

The invention therefore also proposes a system for estimating a side-slip angle of an aircraft moving in the air, with means for measuring a side-slip angle presented locally by the air relative to the aircraft, characterized by means for determining the side-slip angle of the aircraft as a function of the measured angle and of an information item about the incidence of the aircraft.

In terms of method, the invention proposes a method for estimating a side-slip angle of an aircraft moving in the air, characterized by the following steps:

measuring a side-slip angle presented locally by the air relative to the aircraft;

determining the side-slip angle of the aircraft as a function of the measured angle and of an information item about the incidence of the aircraft.

This system and this method may incorporate optional characteristics corresponding to those envisioned hereinabove for the estimation device.

BRIEF DESCRIPTION OF THE DRAWINGS

Other characteristics and advantages of the invention will become clearer upon reading the description hereinafter, given with reference to the attached drawings, wherein.

DESCRIPTION OF THE PREFERRED EMBODIMENTS

Figure 1:
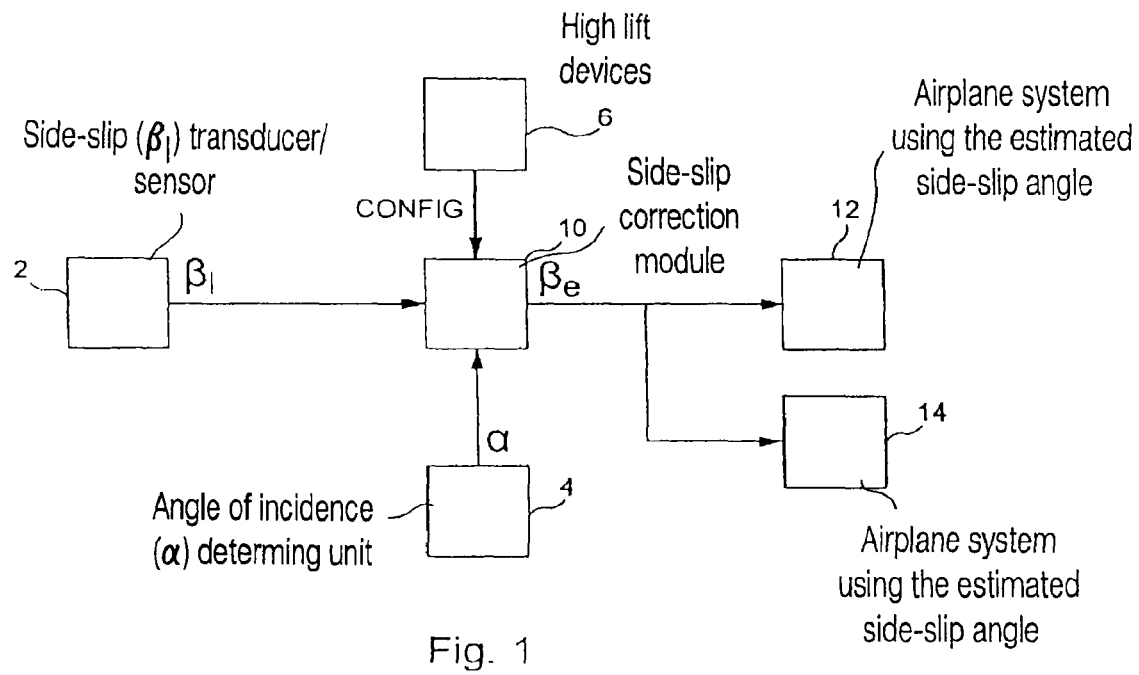
FIG. 1 represents a system for estimating a side-slip angle, implemented according to the teachings of the invention.

The system of FIG. 1 comprises a side-slip transducer or sensor 2, which delivers a measurement of a local side-slip angle $\beta_l$ representing the orientation of the air flow at the location of the sensor (relative to a fixed reference associated with the aircraft).

Such a side-slip sensor is, for example, of the "weather vane" type, or in other words formed from a vane mounted on a pivot in such a way as to become positioned in the local air flow at the level of the sensor, parallel to the air flow at this location.

Figure 2:
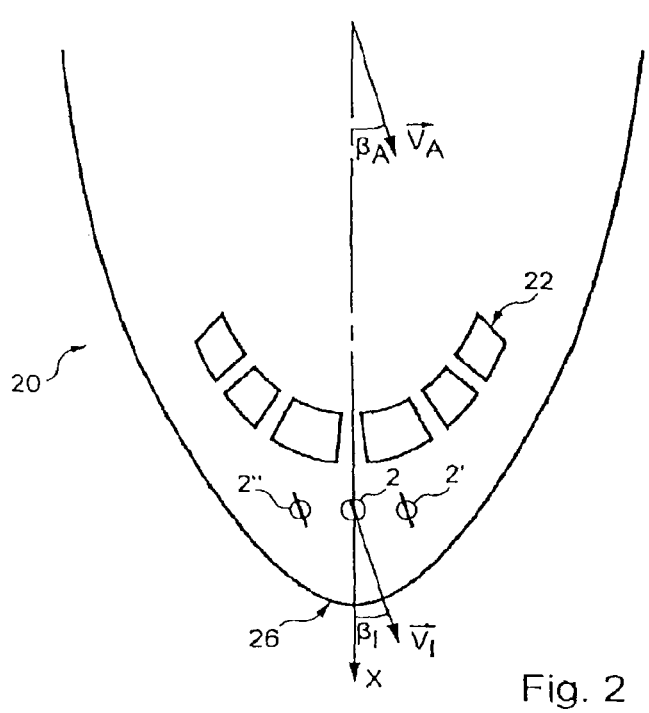
FIG. 2 represents the front part of an airplane incorporating side-slip sensors.

FIG. 2 illustrates an example of the positioning of a side-slip sensor 2 on the fuselage surface, in the forward part of an aircraft (in this case an airplane) 20, precisely in the region situated forward of cockpit 22 (the term "forward" being understood in traditional manner, or in other words toward nose 26 of the airplane, in the direction X also illustrated in FIG. 2).

The measured side-slip angle $\beta_l$ is therefore the angle formed locally between the orientation of the velocity vector $\vec{V}_l$ of the air flow at the level of the sensor and the direction X projected onto a horizontal plane.

For the purpose of redundancy, other side-slip sensors may be provided on the surface of the airplane fuselage, such as, for example, sensors 2', 2" visible in FIG. 2.

The signals measured by each of the side-slip sensors may undergo the treatment described hereinafter for side-slip sensor 2. Alternatively, the signals issued by two or more side-slip sensors may be combined in order to deduce therefrom an average signal, which will undergo the treatment described hereinbelow.

The system illustrated in FIG. 1 also comprises a device 4 for determining the angle of incidence $\alpha$ of the aircraft.

Such a device includes, for example, an incidence sensor (possibly of the weather vane type). It is recalled that the angle of incidence $\alpha$ is the angle formed, by projection onto a vertical plane, between the axis X of the fuselage and the flight direction $V_A$ in the air mass.

The local side-slip information item $\beta_l$ emitted by side-slip sensor 2 (or, alternatively, by a set of side-slip sensors as already mentioned) and the angle of incidence $\alpha$ determined by device 4 are transmitted to a side-slip correction module 10, which generates, on the basis of these information items, an information item $\beta_e$ representative of the side-slip angle estimated for the entire airplane 20 (hereinafter "airplane side slip") according to methods that will now be described.

It is recalled here that this side-slip angle is the angle formed, in a horizontal plane, between the velocity vector of the airplane in the air and a reference associated with the airplane.

In a first embodiment, correction module 10 stores a plurality of correspondence tables in memory.

Each correspondence table contains a set of values of the estimated side-slip angle $\beta_e$, each associated with particular values of the local side-slip angle $\beta_l$ and with the angle of incidence $\alpha$ (which therefore constitute the entries of the correspondence table).

Furthermore, each correspondence table is associated with particular conditions of configuration of lift devices (of the slats and flaps type), thus making it possible to adapt the correction of the side-slip angle as a function of the aerodynamic configuration of airplane 20 (this configuration having an effect on the difference that exists between the measured local side-slip angle $\beta_l$ and the side-slip angle of the entire airplane, or in other words the value to be estimated).

Thus correction module 10 selects a correspondence table as a function of the configuration information item CONFIG representative of the position of high-lift devices 6 and, in the selected correspondence table, it reads the estimated value of the airplane side-slip angle $\beta_e$ associated with the values of the local side-slip angle $\beta_l$ and of the angle of incidence $\alpha$ that module 10 receives respectively from side-slip sensor 2 and from device 4 for determining the angle of incidence.

The estimated airplane side-slip angle $\beta_e$ is then transmitted to the different airplane systems 12 and 14 using this information item, namely, for example, an indicator of the side-slip angle for the crew, the flight control calculators, the automatic pilot, etc.

Correction module 10, in common with device 4 for determining the angle of incidence, can be implemented in the form of a processor executing a program that makes it possible to apply the functionalities just described, especially reading of data in correspondence tables stored in a memory associated with this processor.

Such a system can be integrated into the heart of the "air" data calculator, with which airplane 20 is equipped, commonly known by the abbreviation ADC (for "Air Data Computer").

The correspondence tables mentioned hereinabove are, for example, filled in during flight tests with a dedicated apparatus provided with other sensors for measuring the side-slip angle (in order to obtain a precise representation of the side-slip of the airplane). This step corresponds to calibration of correspondence tables, which can then be used as standard for all machines of the same type.

According to a second conceivable embodiment, correction module 10 is able to determine the estimated side-slip angle $\beta_e$ of the airplane as a function of the angle of incidence $\alpha$ of the airplane and of the measured local side-slip angle $\beta_l$, by means of a formula that models the correction to be applied and, for example, is of the following type:

$$\beta_e = (\beta_l + Z)K + I,$$

with $K = A\alpha^2 + B.\alpha + C$ $I = D\alpha^2 + E\alpha + F,$ where Z permits a correction of the angular adjustment of side-slip sensor 2 if necessary, for example in order to prevent it from reaching its stop (if the sensor possesses such a stop) in the range of local side-slip angles under consideration, and A, B, C, D, E, F are parameters that can if necessary depend on the local side-slip angle $\beta_l$ (thus making it possible also to influence the amplitude of the correction by means of the side-slip angle). The changes of deflection of the high-lift devices can be managed by using, for example, a correspondence table containing such parameters for each deflection.

The values of the coefficients A, B, C, D, E, F depend on the location of the side-slip transducer. For example, the following orders of magnitude can be encountered: $A \sim 10^{-3}$, $B \sim 10^{-2}$, $C \sim 10^{-1}$, $D \sim 10^{-3}$, $E \sim 10^{-1}$, $F \sim 1$.

The foregoing examples are merely possible modes of implementation of the invention, which is not limited thereto.

The invention claimed is:

1. A device for estimating a side-slip angle ($\beta_e$) of an aircraft moving in the air, comprising:
   means for receiving a measured side-slip angle ($\beta_l$) presented locally by the air relative to the aircraft; and
   means for determining the side-slip angle ($\beta_e$) of the aircraft as a function of the measured side-slip angle ($\beta_l$) and of an information item about an angle of incidence ($\alpha$) of the aircraft.

2. A device according to claim 1, wherein the means for determining the side-slip angle ($\beta_e$) of the aircraft includes means for multiplying the measured angle ($\beta_l$) by a first factor that depends on the incidence information item ($\alpha$).

3. A device according to claim 2, wherein the means for determining the side-slip angle ($\beta_e$) of the aircraft includes means for adding a second factor that depends on the incidence information item ($\alpha$).

4. A device according to claim 1, wherein the means for determining the side-slip angle ($\beta_e$) of the aircraft includes means for reading the side-slip angle ($\beta_e$) of the aircraft in a correspondence table having at least the measured angle ($\beta_l$) and the incidence information item ($\alpha$) as entries.

5. A device according to claim 4, further comprising:
   means for selecting said correspondence table as a function of an information item (CONFIG) indicative of the configuration of lift devices of the aircraft.

6. A device according to claim 4, wherein a plurality of correspondence tables are stored in a memory.

7. A device according to claim 1, further comprising:
   a side-slip sensor including a vane positioned in a local airflow, wherein said measured side-slip angle is formed between the airflow and a fuselage axis of the aircraft projected onto a horizontal plane.

8. A device according to claim 7, wherein two or more side-slip sensors each measure a side-slip angle ($\beta_l$) presented locally by the air relative to the aircraft, and an average signal of the two or more measured side-slip angles ($\beta_l$) is determined.

9. A method for estimating a side-slip angle ($\beta_e$) of an aircraft moving in the air, the method comprising:
   measuring, using a side-slip sensor, a side-slip angle ($\beta_l$) presented locally by the air relative to the aircraft;
   determining, using a correction module, the side-slip angle ($\beta_e$) of the aircraft as a function of the measured angle ($\beta_l$) and of an information item about an angle of incidence ($\alpha$) of the aircraft.

10. A method according to claim 9, wherein the step of determining the side-slip angle ($\beta_e$) of the aircraft includes multiplying the measured angle ($\beta_l$) by a first factor that depends on the incidence information item ($\alpha$).

11. A method according to claim 10, wherein the step of determining the side-slip angle ($\beta_e$) of the aircraft includes adding a second factor that depends on the incidence information item ($\alpha$).

12. A method according to claim 9, wherein the step of determining the side-slip angle ($\beta_e$) of the aircraft includes reading the side-slip angle ($\beta_e$) of the aircraft in a correspondence table having at least the measured angle ($\beta_l$) and the incidence information item ($\alpha$) as entries.

13. A method according to claim 12, further comprising:
selecting said correspondence table as a function of an information item (CONFIG) indicative of the configuration of the lift devices of the aircraft.

14. A method according to claim 9, wherein said measured side-slip angle is formed between a vane of a side-slip sensor positioned in an airflow and a fuselage axis of the aircraft projected onto a horizontal plane.

15. A method according to claim 14, wherein two or more side-slip sensors each measure a side-slip angle ($\beta_l$) presented locally by the air relative to the aircraft, and an average signal of the two or more measured side-slip angles ($\beta_l$) is determined.

16. A method according to claim 9, wherein a plurality of correspondence tables are stored in a memory.

* * * * *